June 19, 1962 A. L. KOHL ET AL 3,039,749
PACKING FOR GAS-LIQUID CONTACTING EQUIPMENT
Filed Nov. 13, 1957 2 Sheets-Sheet 1

ARTHUR L. KOHL
ALFRED L. FULLER
INVENTORS

ATTORNEY

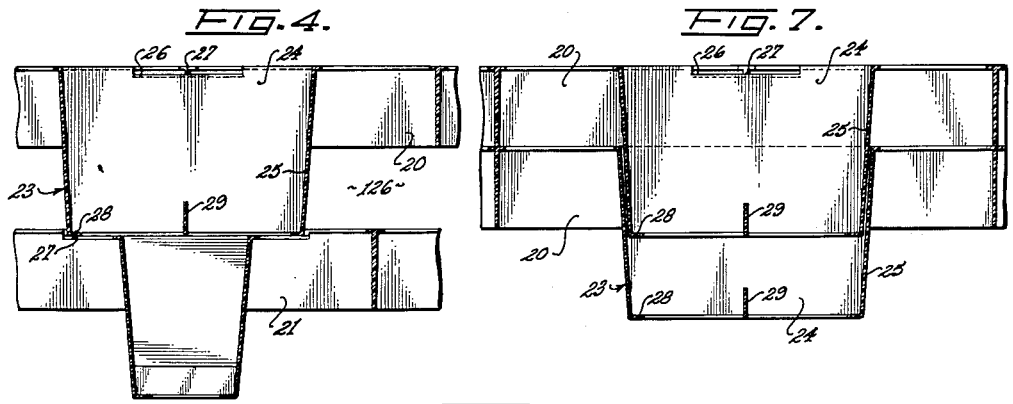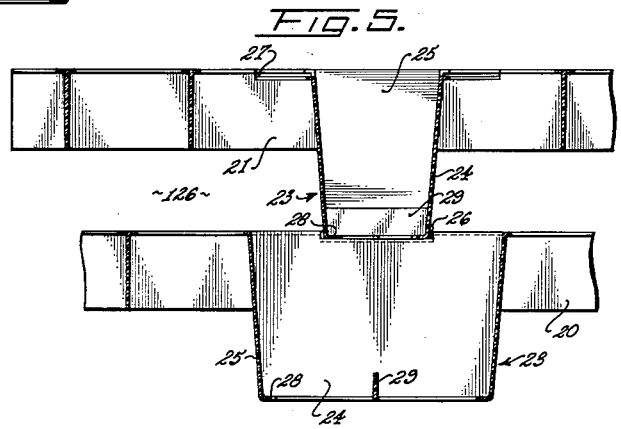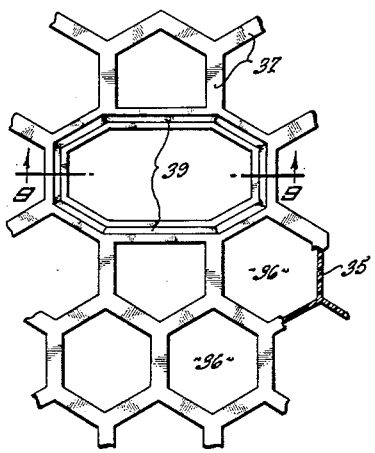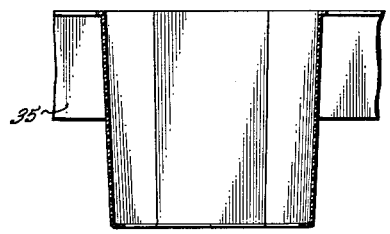
ARTHUR L. KOHL
ALFRED L. FULLER
INVENTORS 3,039,749
PACKING FOR GAS-LIQUID CONTACTING
EQUIPMENT
Arthur L. Kohl, Whittier, and Alfred L. Fuller, Fullerton, Calif., assignors to The Fluor Corporation, Ltd., Los Angeles, Calif., a corporation of California
Filed Nov. 13, 1957, Ser. No. 696,205
4 Claims. (Cl. 261—112)

This invention relates generally to improvements in gas-liquid contacting structures usable for any of various purposes served by effecting extended surface exposure of the liquid to gas or vapors, such purposes including liquid cooling, evaporation, gas absorption, scrubbing and the like. Having particularly advantageous adaptability to the cooling of water, the invention will be described in a typical application for that illustrative purpose.

More particularly, the invention is concerned in certain of its aspects with improvements in grid-type packing for installation in water cooling tower chambers within which the water to be cooled is passed downwardly in extensively filmed condition on the surface of the packing and in correspondingly extended exposure to cooling air flowing up through the packing. The particular form of packing with which this invention is concerned may be characterized as a cellular grid-type, being cellular by reason of each grid deck or unit being composed of intersecting strips disposed in essentially vertical planes and defining cells or voids shaped and dimensioned in accordance with the strip arrangement and dimensions.

Water cooling tower packing as thus generally characterized, heretofore has been proposed or used in the form of grids made of strips in cellular arrangement and having uniform thickness between the top and bottom edges, the grids being placed directly in contact, i.e. without vertical spacing between them. Such grids have been made of wood or other material which together with the particular forms and relative arrangements of the grids have limited their effectiveness and practicability in various respects including lack of capacity for most effective repeated break-up and filming of the water, inadequate distribution laterally of the air and water during their passage through the packing, excessive weight and tendencies of the grid materials towards warpage or other deterioration, and limitations in their adaptability for pre-fabrication in conveniently usable and transportable forms.

The present invention represents an important advance in grid-type cellular packings by reason of both the physical forms and compositions of the grid units. As to the physical form of the grid, the invention contemplates a novel cellular structure distinguished from the conventional in two important respects; the first being the provision of lateral projections or flanges in such association with the grid strips as will better serve the functions of partially intercepting droplets of water for distribution over the larger filming surfaces of the grid; the second being the provision of means for maintaining the grids in predetermined spaced relation so that some of the water falls alternately in film and droplet form, and in a manner whereby cooling efficiency is promoted by the aforementioned projections or flanges, all as will later appear. Most desirably, the individual grid units are pre-formed with integrated spacer means serving to maintain adjacent grids in vertically spaced relation, and preferably also in pre-determined horizontal position such that the strips or cells are relatively offset. In this manner we provide for high degree of distribution, redistribution and filming of the water in exposure to both vertically and transversely flowing air, all at very low air pressure drop through the packing as permitted by such predetermined relationships as the cell, strip and projection dimensions, void areas to total projected area of the grid, and the inter-grid spacing.

A further object and accomplishment of the invention is the provision of a grid structure having the characteristics described, molded integrally of durable, water resistant and lightweight material such that we achieve not only the functional advantage of efficient water cooling, but also structural advantages flowing from packing having greatly reduced weight which permits reduced size and cost of the cooling tower structure which accommodates the packing. The invention contemplates molding each entire grid unit of a suitable organic plastic material such as the known polyethylene, polystyrene, polyester, polyvinyl or phenol formaldehyde resins, which may be molded in a cellular grid as later described, having indefinitely the desirable resistance to water, and adequate structural strength and shape permanency notwithstanding the thinness and therefore lightness in weight of the sections.

All the above-mentioned and additional features and objects of the invention, together with the details of an illustrative embodiment, will be more fully understood from the following detailed description of the accompanying drawings, in which.

Figure 2:
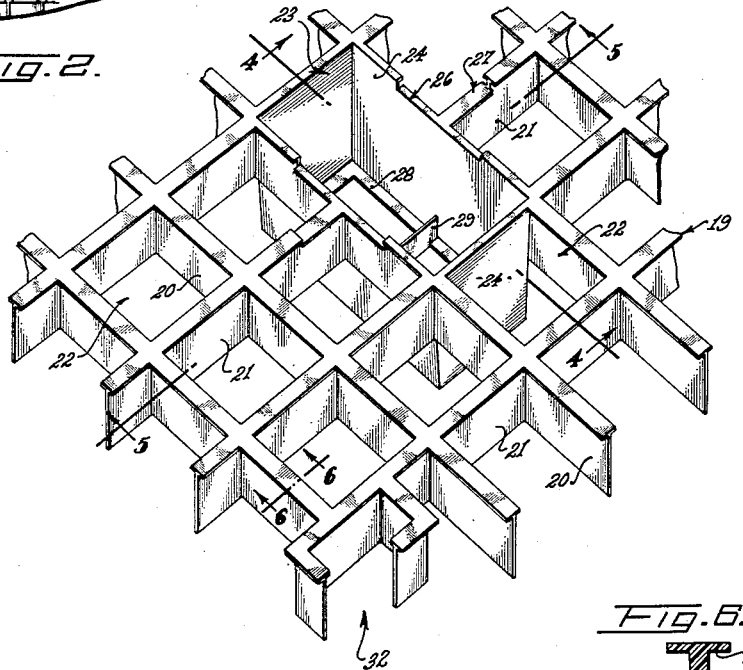
FIG. 2 is a view showing in perspective a corner portion of one of the grids.
Figure 6:
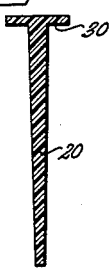

FIGS. 4, 5 and 6 are enlarged cross-sections taken in the planes, respectively, of lines 4—4, 5—5 and 6—6 in FIG. 2;

FIG. 7 is a fragmentary vertical section showing the nesting relation between the spacer legs as the grids are stacked for shipment;

FIG. 8 is a plan view illustrating a variational form of the invention; and

FIG. 9 is a vertical section taken on line 9—9 of FIG. 8.

Figure 1:
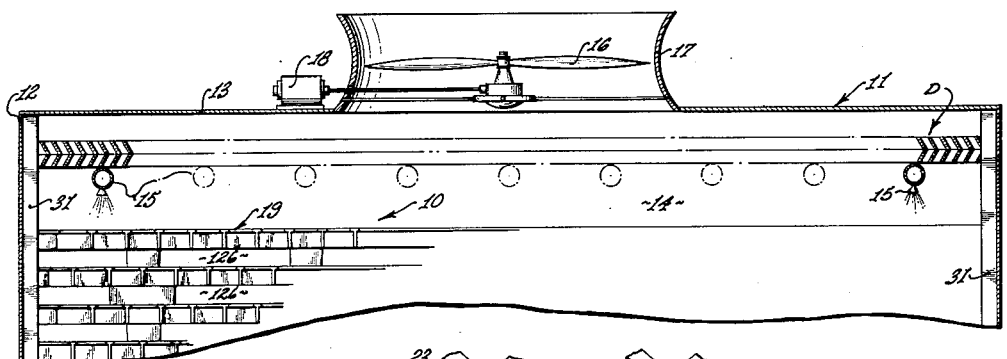
FIG. 1 is a fragmentary view showing in vertical cross section the upper portion of a typical water cooling tower containing the present grid-type packing.

Referring first to the general showing of FIG. 1, as illustrative we have shown the packing, generally indicated at 10, to be contained within a water cooling tower 11 otherwise of conventional construction comprising vertical and top walls 12 and 13 defining a cooling chamber 14 within which water sprayed downwardly from headers 15 is contacted in extensively filmed condition while passing down through the packing 10, by air flowing up through the chamber. The cooling tower may be of an induced draft type in which the air displacement upwardly through the chamber is effected by a fan 16 contained within the usual ring 17 and driven by motor 18.

Packing 10 comprises a vertical succession of horizontally extending, superposed grids 19 which, depending upon the size of the cooling chamber in any given instance, may correspond in area thereto, or the grids may be preformed and filled in sections into the chamber so as to occupy substantially entirely the path of water and air flow therethrough. Referring to FIG. 2, each of the grids 19 is shown to be formed of integrally molded, thin sheet-like strips 20 and 21 extending in intersecting vertical planes to define between the strips, vertically open cells 22, the latter in the FIG. 2 form being square in cross-section. The side surface of the strips 20 and 21 present in the aggregate, large areas for filming of the water passing downwardly through the grids, in intimate contact with the upwardly displaced air.

As further illustrated in FIGS. 4 to 6, each grid has a plurality of integrally molded spacer legs 23 projecting below each grid a distance preferably substantially equal to the vertical dimension of the strips 20 and 21, each leg occupying the area of a plurality (typically two) of the cells 22 and being defined by the sides 24, which are intermediates of strips 20, and ends 25, which are intermediates of strips 21. Sides 24 and ends 25 of the legs are downwardly tapered so that the legs are receivable one within the other in nested relation to permit the grids or grid sections to be stacked in interengagement for purposes of transportation, thus occupying minimum volume. As will be understood, in this condition, the stacked individual grids are oriented relatively so as to bring the legs into the aligned relation of FIG. 7. When stacked in the cooling chamber, however, the legs have the relative position shown in FIGS. 4 and 5, in which the leg of an upper grid directly overlies and extends centrally at right angles to the leg directly below. When thus related, the legs maintain between successive grids a spacing at 126 corresponding typically to the deck thickness, and the legs present hollow passages for air flow upwardly through them.

It is desirable that in addition to maintaining vertically spaced relation between the grids, the legs serve the further functioning of maintaining the strips and cells 22 of vertically adjacent grids in horizontally offset relation corresponding preferably to one-half the cross-sectional dimensions of the cells, all as clearly illustrated in FIGS. 4 and 5. For this purpose, the top edges of the leg sides 24 are notched at 26, and strips 21 extending beyond the sides are notched at 27, to receive the bottom of the spacer leg above, thus to maintain the grids in the stated offset relation. As to further detail, each leg may be formed with an in-turned bottom flange 28 and a transverse stiffener web 29 molded integrally with the sides 24.

Hereinabove, reference has been had to formation of the webs with lateral projections or flanges, an understanding of the reasons for which may be benefited by brief mention at this point of the conditions of water flow and filming downwardly through the packing. Upon being sprayed laterally from the headers 15, the water is dispersed in droplets onto the packing so that some of the water impinges against and films over the surfaces of the cell walls, while other droplets may tend to pass more directly downwardly through the cell voids. Also the water films flowing down from grid-to-grid tend to collect and redistribute as droplets from the bottom edges of the strips, with some of the droplets being impinged against the sides of the cells below, and others tending to fall straight through. To an important degree intimacy of contact between all the water and all the cooling air, as well as lateral distribution and filming of the droplets over the strip surfaces, is aided by the transverse air flow permitted between the grids by reason of their spacing. However, it is important that further provisions be made in association with the strips in cell formation, to provide for additional breaking up and distribution of water from its droplet form, all in a manner maintaining desirably low resistance and air flow pressure drop through the entire packing.

For this purpose, we form the strips 20 and 21 with integrally molded lateral projections most desirably in the form of thin webs or flanges 30 at their upper edges thus presenting essentially T-sections as viewed in FIG. 6. In this same view, we show the strips 20 (and the same is true of strips 21) to have a slight downward taper, the degree of the taper being somewhat exaggerated for clarity. Thus as regarded in the FIG. 2 aspect, flanges 30 centrally and symmetrically overlie the downwardly continuing strips 20 and 21, and present upwardly exposed surface areas substantially greater than those presentable by the strips per se, for aid to conversion into filmed condition, of a larger percentage of the water than could be so affected in the absence of the projections. It is clear from FIG. 2 that the webs 30 extend horizontally along the tops of interconnected strips to merge integrally above cell corners formed by the interconnected strips thereby materially to stiffen said plastic molded unit.

Figure 3:
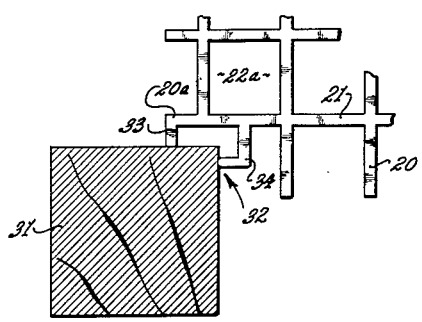
FIG. 3 is a fragmentary plan showing the relation between one of the cooling tower corner posts and the adjacent grid corner.

Referring to FIG. 3, the grid corners to be located adjacent the corner posts 31 of the cooling tower, are in effect recessed at 32 to accommodate the posts. A suitable configuration consists of providing one of the strips 20 with a short flange 33 at right angles with a projecting half length 20a of the strip, and forming on the latter midway of the cell 22a an angular strip projection 34, both projections being engageable against the surfaces of the corner post.

The form of the invention illustrated in FIG. 8 is generally similar to the described embodiment, except that here the strips 35 are molded in hexagonal patterns to form correspondingly shaped hexagonal cells 36, the tops of the strips being molded, as before, integrally with T-flanges 37. Here the spacer leg is shown to be formed and molded integrally by continuing along straight lines the sides 39 of adjacent cells, downwardly and on a taper, about twice the grid thickness.

As previously mentioned, each unit is integrally molded of a suitable organic plastic such as polyethylene or polystyrene and into units having the following general dimensions or dimensional ranges within which specific sizes may be selected depending upon particular uses for the packing. Assuming the grid form shown in FIGS. 1 to 7, the vertical height of the strips 20 and 21 may range between about one-half inch to four inches, with one and one-fourth inches being suitable for many water cooling chamber uses. The width of the T-flanges 30 may vary between about one-eighth to five-eighths inch, with about one-fourth inch being suitable for a one and one-fourth inch vertical dimension of the strips. The projection sizes will increase with increased cell size so that the projected free area of the grid may be approximately constant and preferably in the range of 60 to 85 percent of the total grid area. The horizontal spacing of the strips 20 and 21 may vary between about three-fourths inch to three inches for square cells, and for other shapes the cell areas may range between about one-half to nine square inches, typically about four square inches. The average thickness of the strips 20 and 21 may vary between about 0.02 to 0.1 inch, with a thickness at about 0.07 inch tapering down to 0.04 inch.

Concerning the installed packing, the vertical spacing between adjacent grids should be a minimum of about one-half inch, and typically about one and one-fourth inch. Using thin sections as described, the void space of the installed packing will amount to over 90 percent of the total volume of the packing. The weight of the installed packing may be kept well under 10 pounds per cubic foot and typically in the neighborhood of 2 pounds per cubic foot.

In further consideration of the operation of a cooling tower containing the packing, the effect of the fan 16 is to induce upwardly through the packing a generally uniform air flow which is mainly vertical but with some lateral air distribution occurring within the inter-grid spaces 26. Before leaving the cooling chamber, the moist air may pass through a suitable drift eliminator D overlying the headers 15, and which serves to remove entrained water particles. In being sprayed onto the packing, the water is given extensive lateral distribution and, as previously mentioned, it is caused to film the surfaces of the cells 22 and to fall from the lower edges of the strips 20 and 21. It will be noted that by reason of the offset relation of the cells, referring particularly to FIG. 1, the water falling from the lower edge of each grid strip drops onto surfaces of the flanges 30 below, some of such water falling through the offset cells of the deck next below onto the aligned flanges of the third deck in downward sequence. The effect of the flanges 30 is thus to present splash surfaces which when impinged by water falling such distances, causes the water to break-up and distribute laterally in smaller droplets in the path of rising air streams. Thus the ultimate effect of the total packing is to assure extensive filming and particle break-up of the water to give that degree of surface exposure as will assure efficient cooling. By reason of the high efficiency attainable, the cooling chamber dimensions, particularly its height, may be reduced below dimensions ordinarily required for water cooling under comparable conditions, and as we have mentioned before, by reason of the very light-weight of the packing the load carrying and structural requirements of the tower may be materially economized.

While it is preferable to install the packing as described, i.e. with the grids having their spacer legs at the bottom and flanges 30 at the top, it is possible to use the grids in inverted positions, and the claims are to be construed accordingly.

This application is a continuation-in-part of our co-pending application Serial No. 570,871, filed March 12, 1956 on Packing for Gas-Liquid Contacting Equipment, which prior application became abandoned on April 23, 1958.

We claim:

1. Packing adapted to be used as horizontally disposed grid decking units to be placed in superposed engagement in gas-liquid contacting equipment, each unit comprising interconnected sheet-like strips extending in planes generally normal to the decking and forming vertically open cells the sides of which present water filming surfaces, splash projections extending substantially horizontally from said strips to present substantially horizontal splash surfaces to water dropping from decking located vertically thereabove, certain of said cells being horizontally elongated and enlarged in relation to cells adjacent thereto, the strips forming said enlarged cells having extensions projecting vertically away from said splash projections to form horizontally spaced apart cellular projections at one side of said decking unit, said cellular projections being sized and shaped to nest into the enlarged cells of an adjacent unit when said units are stacked in one position and said cellular projections being substantially equally spaced apart about a vertical axis through said unit whereby upon partial rotation about said axis of one of said units relative to the adjacent unit the projections thereon cooperate in a bridging and non-nesting relation with the enlarged cells of the adjacent unit thereby maintaining the units in spaced relationship vertically.

2. Packing adapted to be used as horizontally disposed grid decking units to be placed in superposed engagement in gas-liquid contacting equipment, each unit comprising interconnected sheet-like strips extending in planes generally normal to the decking and forming vertically open cells the sides of which present water filming surfaces, splash projections extending substantially horizontally from said strips to present substantially horizontal splash surfaces to water dropping from decking located vertically thereabove, certain of said cells being enlarged in relation to cells adjacent thereto, the strips forming said enlarged cells having extensions projecting vertically away from said splash projections to form horizontally spaced apart cellular projections at one side of said decking unit, said cellular projections being sized and shaped to nest into the enlarged cells of an adjacent unit when said units are stacked in one position and said projections being spaced apart about a vertical axis through said unit in such relation that upon partial rotation about said vertical axis of one of said units relative to the adjacent unit the projections on said one unit cooperate in a bridging and non-nesting relation with the cells of the adjacent unit thereby maintaining the units in spaced relationship vertically.

3. The invention as defined in claim 2 in which the vertically open projected area of the decking is between about 60 to 85 percent of the total deck area.

4. The invention as defined in claim 2 in which the projections on said one unit are engageable within recesses in the top surface of the adjacent lower unit to interlock said units after said partial rotation.

References Cited in the file of this patent

UNITED STATES PATENTS

| | | |
|---|---|---|
| 2,042,127 | Sayles | May 26, 1936 |
| 2,098,667 | Miller | Nov. 9, 1937 |
| 2,330,901 | Mart | Oct. 5, 1943 |
| 2,608,398 | Park et al. | Aug. 26, 1952 |
| 2,651,515 | Agnew et al. | Sept. 8, 1953 |
| 2,695,773 | McGrath | Nov. 30, 1954 |
| 2,793,017 | Lake | May 21, 1957 |
| 2,917,292 | Hittrich | Dec. 15, 1959 |

FOREIGN PATENTS

| | | |
|---|---|---|
| 413,159 | France | May 20, 1910 |
| 443,008 | Germany | Apr. 13, 1927 |
| 717,739 | Germany | Feb. 21, 1942 |
| 496,051 | Great Britain | Nov. 21, 1938 |
| 550,406 | Great Britain | Jan. 6, 1943 |
| 582,630 | Great Britain | Nov. 22, 1946 |
| 644,976 | Great Britain | Oct. 18, 1950 |